G. O. HODGE.
PLOWHITCH.
APPLICATION FILED OCT. 19, 1920.

1,426,383.

Patented Aug. 22, 1922.

INVENTOR
J. O. Hodge
BY
ATTORNEY

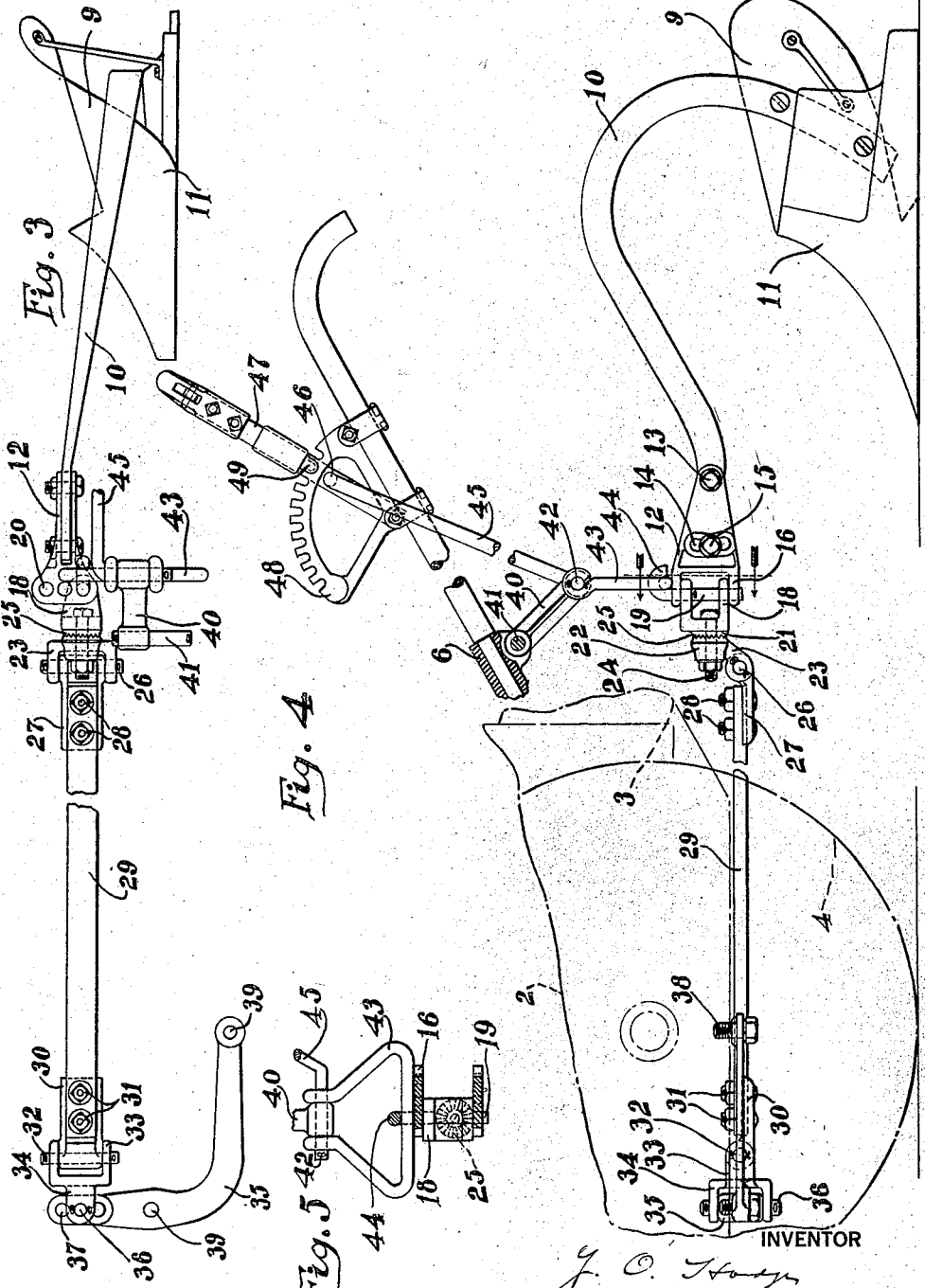

UNITED STATES PATENT OFFICE.

GEORGE ORVIL HODGE, OF BRISTOL, CONNECTICUT, ASSIGNOR TO THE NEW BRITAIN MACHINE COMPANY, OF NEW BRITAIN, CONNECTICUT, A CORPORATION OF CONNECTICUT.

PLOWHITCH.

1,426,383.   Specification of Letters Patent.   Patented Aug. 22, 1922.

Application filed October 19, 1920. Serial No. 418,068.

*To all whom it may concern:*

Be it known that GEORGE O. HODGE, citizen of the United States, residing at Bristol, in the county of Hartford and State of Connecticut, has invented certain new and useful Improvements in Plowhitches, of which the following is a specification.

This invention relates to what I shall for convenience term a plow hitch by means of which a plow can be properly connected with a draft appliance of whatever character it may be, but which is generally and preferably a tractor. The draft power may be secured in any desirable manner, for instance I may employ for this purpose the tractor shown in my copending application Serial No. 357,256 filed February 9, 1920. I have a number of motives in view, among them being the provision of means of a simple nature by which the plow usually through its beam, can be connected with the tractor or some part thereof in such way, as to effect in a ready manner the necessary movements of the plow such as take place during plowing.

In the drawings accompanying and forming part of the present specification, I have shown in detail one of the many forms of embodiment of the invention, which to enable those skilled in the art to practice the same will be set forth fully in the following description. The novelty of the invention will be included in the claim succeeding said description.

Referring to said drawings:

Fig. 3 is a top plan view of certain of the principal parts.

Fig. 4 is a sectional side elevation of the same.

Fig. 5 is a sectional detail hereinafter more particularly described.

Like characters refer to like parts throughout the several views.

Figure 1:
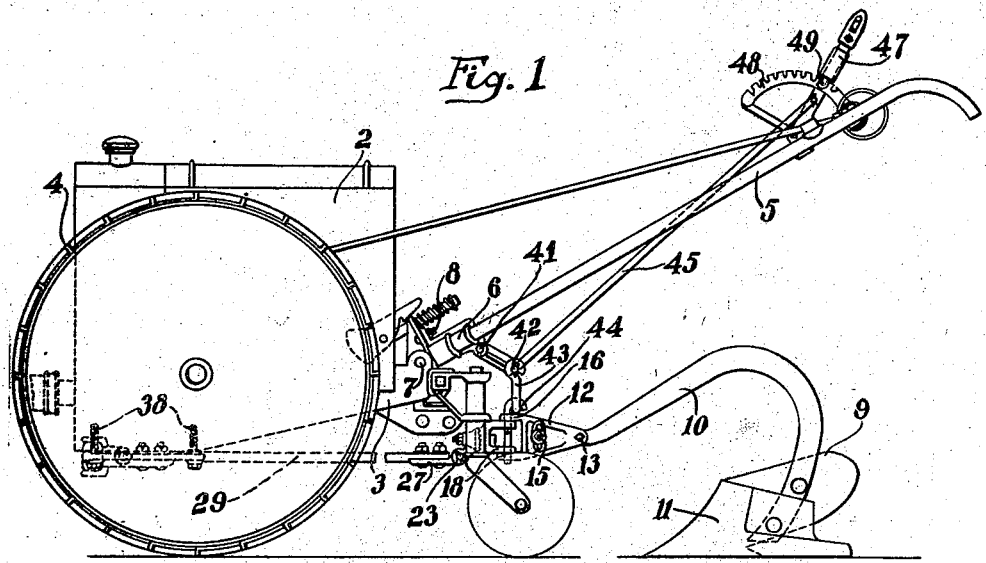
Figure 1 is a side elevation of a plow-hitch involving the invention and showing the same associated with a tractor.
Figure 2:
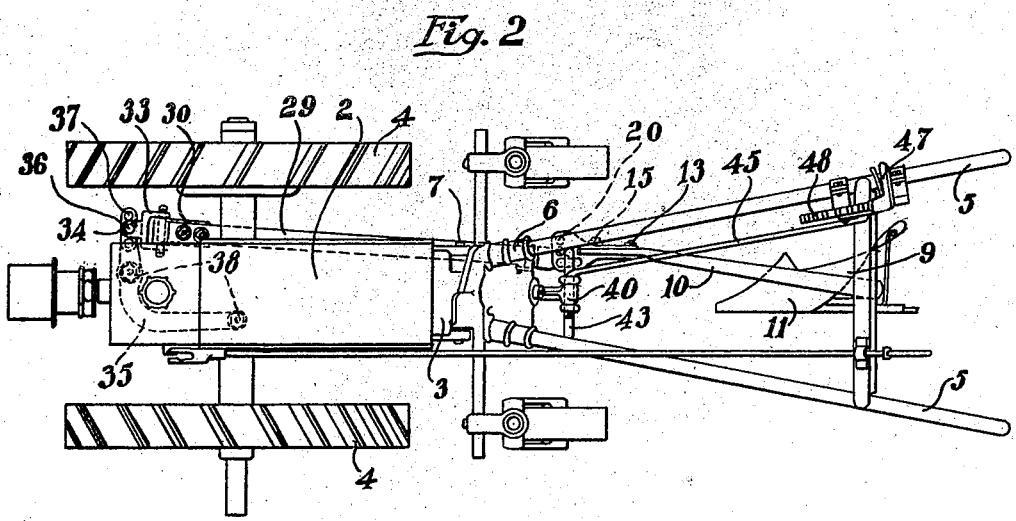
Fig. 2 is a top plan view of the same.

As I have already noted the plow hitch may be mounted in operative relation with some draft appliance of suitable kind, although it is of especial utility when conjoined, for instance with what is known as a tractor which is a power propelled vehicle. Such a vehicle is shown in Figs. 1 and 2 and partly by dotted lines in Fig. 4, being designated in a general way by 2. The tractor shown comprises a frame as 3 to which are connected the traction wheels 4 at opposite sides thereof. The tractor is provided with the usual adjuncts for propelling and controlling the same. The controlling means comprises practically handles 5 rigidly connected at their forward ends with a block 6, this block being pivoted as at 7 to the frame 3 by reason of which the controlling handles may be raised or lowered as desired. In addition to this raising and lowering of the two handles they have together a lateral swinging motion. This lateral swing of the block however forms no part of the present case but is covered in a copending application Serial No. 418,285 filed Oct. 20, 1920. The means by which the controlling handles are clamped in their laterally adjusted position whatever that may be, are denoted in a general way by 8 and appear only in Fig. 1.

Generally speaking the plow like the tractor may be any one of several different types. The plow shown is denoted in a general way by 9 and it comprises a beam 10 longitudinally curved and to the bottom of which is connected the share 11. The beam clevis is designated by 12 its rear portion being forked as more or less common and between the sides of the clevis the front end portion of the beam is disposed and is held in connection with the clevis by a pivot as 13 generally consisting of a bolt. The sides of the rear portion of the clevis have vertical arcuate slots 14 through which and through the front of the beam 10 the bolt 15 extends. By loosening the nut of this holding bolt the beam 10 can be vertically adjusted to regulate the depth of furrows and when the adjustment is secured, the nut of the bolt will be set to temporarily maintain the adjustment. The forward or front end of the clevis 12 has a fork 16 which receives in it the branches of the forked bracket 18 the branches of this bracket 18 having registering perforations to receive the bolt 19 which is adapted to interchangeably fit one of the rows of perforations 20 in the branches of the fork 16. This provides a simple way for providing for the adjustment laterally bodily of the plow 9. As shown the transverse portion of the bracket 18 has on its front the enlargement or boss 21 to co-operate with an enlargement or boss 22 at the upper end of the arm 23. Extending through the transverse portion or body of the bracket 18 and also through the two bosses 21 and 22 is a pivot such as the bolt 24 the nut of the bolt serving to draw the two bosses 21 and 22 into firm and substantial engagement in order to retain an adjustment to which I will hereinafter refer. To facilitate the engagement between these two bosses their engaging surfaces are toothed or serrated as at 25 the teeth or serrations positively preventing rotary movement of the two bosses and their associated parts when the nut of the bolt 24 is set. This provides an effective way of securing rotary adjustment when necessary of the plow about a longitudinal axis. The two bosses 21 and 22 are assumed to be in substantial and solid engagement in Fig. 4 in which condition they are held by the nut of the bolt 24. To change this adjustment the nut will be loosened to permit the teeth 25 of the two bosses to be freed by the separation of the bosses and when this is done the beam 10 may be adjusted easily about a longitudinal axis and when the adjustment is accomplished the parts are relatively caused to approach to bring the teeth of the two bosses into mesh at which time the nut of the bolt 24 will be set so as to firmly hold the adjustment.

The arm 23 to which I have referred is flexibly connected as shown by a pivot 26 to a bracket 27 rigidly fastened as by bolts 28 to the under rear side of the rod 29. From this it will be understood that the arm 23 can be swung up and down. Normally during the plowing of a furrow the arm 23 is locked against such swing. When a furrow is completed the arm is unlocked and swung up, through in fact the upward swing of the plow 9. I will hereinafter describe how this particular action is brought about.

A draft member such as the rod 29 extends forwardly under the frame 3 of the tractor and also under the axle of the two wheels 4. As shown it has fastened to its under forward side a bracket as 30 bolts 31 being shown as a convenient means to unite the two parts. There might be cases of course where neither of these brackets 27 and 30 are present for as will be understood the invention involves rather certain broad relations. The bracket 30 is shown as flexibly connected as by the horizontally-disposed pivot 32 with the body of the forked bracket 33. From this it will be clear that the draft member or rod may have an automatic movement about a horizontal axis. The pivot 32 is held against accidental withdrawal by cotter pins. The transverse portion of the forked bracket 33 has as shown the forwardly extending forked lug or ear 34 which straddles the outer branch of the angular bracket or fixture 35. The branch of the fork 34 receives the removable pin 36 adapted to interchangeably fit one of several definitely-spaced perforations 37 in the outer portion of said angular bracket 35. The angular bracket is attached as by bolts or screws 38 to the frame 3 of the tractor these bolts extending through perforations as 39 in said bracket 35. The bracket in question is practically of right angular formation and the forward branch thereof is in proximity to the front end of the frame 3 and the extreme portion thereof extends laterally beyond the frame as best shown in Fig. 2. It is of course rigidly connected with the tractor frame. By reason of the described construction the lateral position bodily of the plow 9 can be adjusted to conform to the draft, that is to say the longitudinal axis of the plow may be moved closer to or further from the line of draft of the tractor in conformity with the character of the furrow being plowed, the disposition of the tractor or the soil being gone over.

It is necessary at times to lift the plow. Sometimes this occurs when a furrow has been completed but at other times it might be at the beginning of the furrow. I have shown a means by which the plow may be raised instantly and if necessary held for a time in the elevated position. The block or bearing 6 to which I have referred, has pivoted in its under side the link 40 the pivot 41 being shown for the purpose. The link 40 is flexibly connected as by the pivot 42 with a yoke-like link 43. The yoke-like link 43 is practically of triangular formation, its lower branch receiving the hook 44 at the upper end of the bolt or pin 19 thus providing a convenient way of flexibly connecting the bolt or pin 19 and the triangular skeleton link 43. The side branches of said skeleton or triangular link 43 converge upward and between their upper ends are received the enlargement at the lower end of the suspending link 40, the pin or pivot 42 extending through the two links. The pin 42 is at the lower end of a rod 45 constituting as shown an integral extension thereof. The rod 45 is jointed as by a pivot connection 46, with the hand lever 47 the handle of which is adjacent one of the two controlling handles 5, the upper one as shown in Fig. 2. This would be the right handle in use. This right handle has rigidly fastened to it a sector or segment 48 in proximity to the hand lever 47, the latter having a spring detent 49 to co-operate with the teeth of the sector or segment which of course is relatively rigid with respect to the hand lever 47. By disengaging the detent 49 from a tooth of the sector or segment 48 with which it is for the time being engaged, the hand lever 47 fulcrumed to the control handle 5 carrying the segment, may be swung either forwardly or backwardly to raise or lower the plow 9 through the intermediate described connections, and when the plow is in the proper condition the detent 49 will be released and will be shot into a tooth space of the segment by a spring to maintain for the time being the adjustment. When it is desired to lift the plow 9 without lifting the handles 5 the hand lever 47 as will be understood, is used for the purpose, and in this case the axis of motion of the plow is through the pivot 26. The plow may be raised at any time without having recourse to the lever 47 by the elevation of the controlling handles 5. In this case the axis of turning motion of the plow is the axis of motion of the handles.

Figure 6:
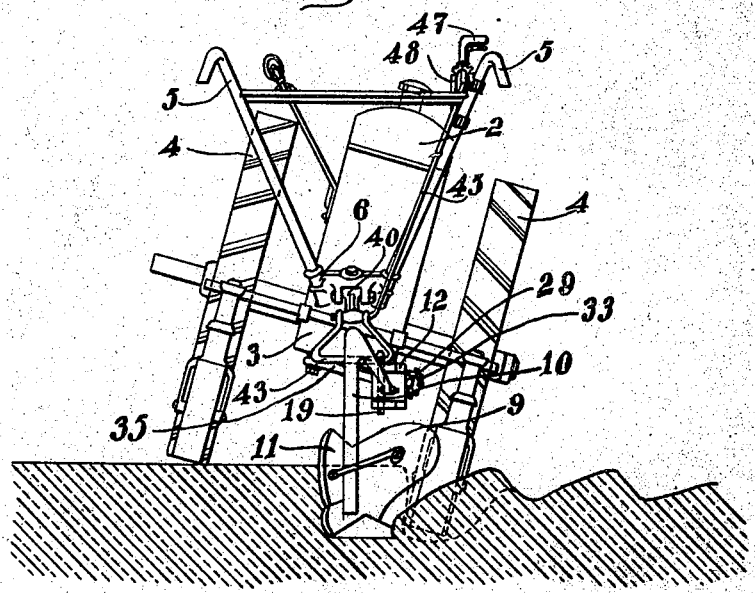
Fig. 6 is a rear elevation showing the tractor tipped laterally and the plow in operative position.

In Fig. 6 which is a rear elevation, I have shown clearly how the draft line of the plow may be brought closer to the driving wheel which is in the furrow, the wheel so positioned being that on the right in said view, the other running on the surface of the ground. Whatever amount the tractor may be tipped by reason of one wheel being in the furrow, the center of gravity approaches the tipped wheel and hence the tractive power of that wheel is greater than the other one. By reason of the fact that the "hitch", so called, can be made nearer the wheel which runs in the furrow, as by drawing the plow from a point proportional to the tractive force of the wheel, there is less tendency of the plow to interfere with the proper steering of the tractor. It will also be observed on reference for instance to Figs. 1 to 4 inclusive, that the connection of the draft rod 29 is forward of the turning center of the tractor by reason of which the plow is promptly turned when the tractor is turned and in the same direction that the wheels thereof are steered.

I have indicated the fact that the invention has been termed a "plow hitch" and have made it clear that this term is used practically for convenience because owing to the fact that the invention is rather broad in its relations it is not always necessary to connect a plow with a power-operated tractor. As will be understood the ground working appliance might be of a nature other than a plow.

What I claim is:

The combination of a power-operated frame having rearwardly-extending controlling handles connected therewith, said frame also having a wheeled axle and also having an angular bracket connected therewith at one side thereof forward of the axle, a farming implement located below the handles, at the rear of the frame, an operative connection between the forward end of the farming implement and the bracket, and means whereby the farming implement can be moved through the action of the controlling handles.

In testimony whereof I affix my signature.

GEORGE ORVIL HODGE.

Witnesses:
ROBT. S. BROWN,
ALICE J. FITZGERALD.